(12) United States Patent
Haltom et al.

(10) Patent No.: US 9,667,775 B1
(45) Date of Patent: May 30, 2017

(54) ANALYZING CALL FORWARDING ACTIVITY

(71) Applicant: Verizon Patent and Licensing Inc., Arlington, VA (US)

(72) Inventors: Jeffrey Haltom, Fishers, IN (US); Thomas A. Gallant, Colorado Springs, CO (US); Heath W. Hendrickson, McKinney, TX (US); Lulia Ann Barakat, McKinney, TX (US)

(73) Assignee: VERIZON PATENT ANS LICENSING INC., Basking Ridge, NJ (US)

( * ) Notice: Subject to any disclaimer, the term of this patent is extended or adjusted under 35 U.S.C. 154(b) by 0 days.

(21) Appl. No.: 15/174,870

(22) Filed: Jun. 6, 2016

(51) Int. Cl.
| | |
|---|---|
| *H04M 7/00* | (2006.01) |
| *H04M 3/42* | (2006.01) |
| *H04M 3/22* | (2006.01) |
| *H04M 3/54* | (2006.01) |

(52) U.S. Cl.
CPC ....... *H04M 3/2281* (2013.01); *H04M 3/2218* (2013.01); *H04M 3/543* (2013.01)

(58) Field of Classification Search
CPC ................. H04M 15/00; H04M 15/47; H04M 2203/6027; H04M 2215/0148; H04M 3/38; B60W 2040/0818; B60W 2040/0872; B60W 2050/0074; B60W 2050/143; B60K 28/06
USPC ... 379/32.01, 32.04, 112.04, 112.08, 114.01, 379/114.14, 133, 134, 137, 139, 201.01, 379/207.14, 207.15, 211.01, 211.02, 219, 379/220.01
See application file for complete search history.

(56) References Cited

U.S. PATENT DOCUMENTS

| | | | | |
|---|---|---|---|---|
| 5,991,377 | A * | 11/1999 | Malik | H04M 15/00 379/114.05 |
| 6,130,938 | A * | 10/2000 | Erb | H04M 3/46 379/142.01 |
| 8,355,492 | B1 * | 1/2013 | Polozola et al. | H04M 3/42068 379/114.15 |
| 2002/0168060 | A1 * | 11/2002 | Huie | H04M 3/38 379/211.02 |
| 2009/0067411 | A1 | 3/2009 | Heidermark et al. | |

(Continued)

OTHER PUBLICATIONS

Wikipedia, "Call forwarding," https://en.wikipedia.org/wiki/Call_forwarding, Mar. 24, 2016, 5 pages.

*Primary Examiner* — Binh Tieu

(57) ABSTRACT

A device may receive, from a network device, call information associated with a call. The call may be from a calling party device. The call may appear to be intended for a destination device. The call information may be received, from the network device, based on the network device having routed the call. The device may determine, based on the call information, that the call appears to have been forwarded to a called party device that is different from the destination device. The device may determine, based on the call information, a forwarding characteristic for the call. The device may determine that the forwarding characteristic satisfies a criterion. The device may send an output message based on the forwarding characteristic satisfying the criterion to support responding to call forwarding activity that has the forwarding characteristic.

20 Claims, 5 Drawing Sheets

(56) References Cited

U.S. PATENT DOCUMENTS

2012/0115451 A1* 5/2012 Roka ..................... H04M 3/42
                                                                           455/417

* cited by examiner

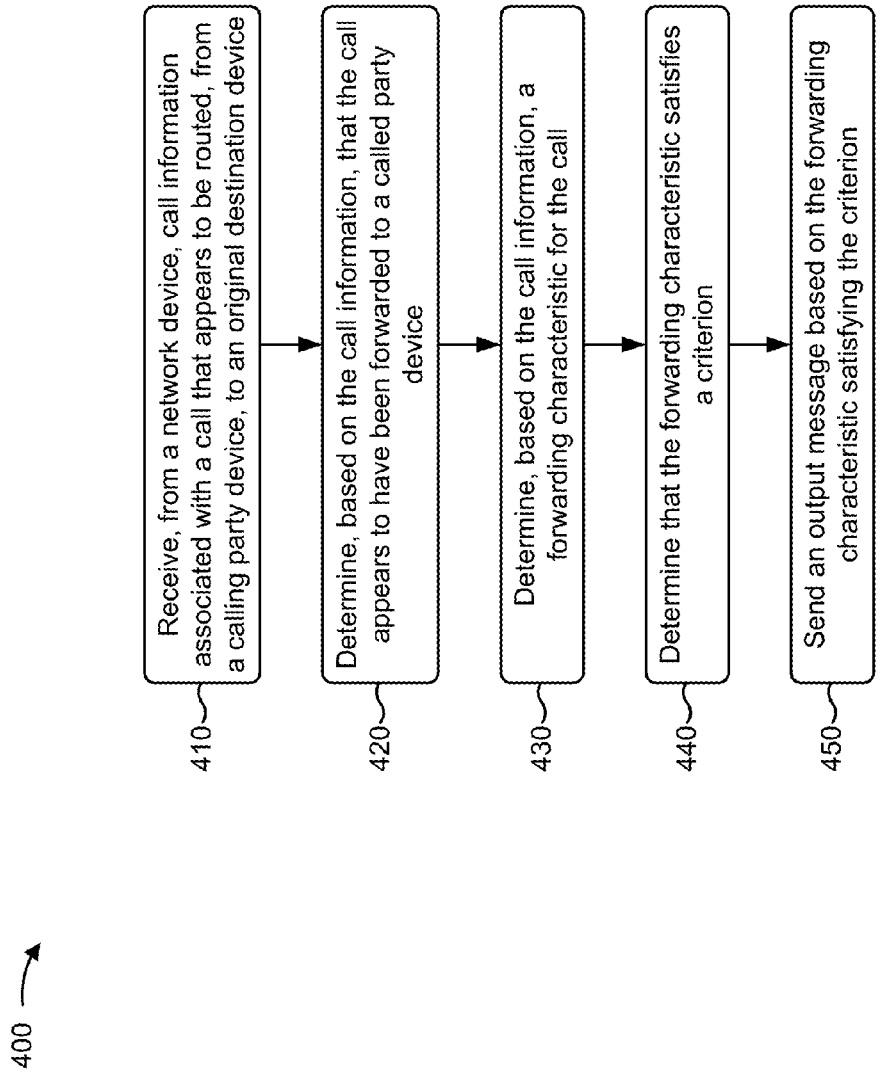

ANALYZING CALL FORWARDING ACTIVITY

BACKGROUND

Call forwarding (e.g., call diversion or the like) may enable users of a network (e.g., a telephone network) to redirect calls to another destination (e.g., to a device associated with a different phone number). Call forwarding may allow a user to set a conditional and/or unconditional forwarding behavior to be applied to incoming calls (e.g., to forward some or all incoming calls).

BRIEF DESCRIPTION OF THE DRAWINGS

FIG. 4 is a flow chart of an example process for analyzing call forwarding activity.

DETAILED DESCRIPTION OF PREFERRED EMBODIMENTS

The following detailed description of example implementations refers to the accompanying drawings. The same reference numbers in different drawings may identify the same or similar elements.

In addition to legitimate uses of call forwarding (e.g., conditional and/or unconditional forwarding to another location associated with a user), call forwarding may be used for various improper purposes. For example, call forwarding may be used to obfuscate call origination information, alter caller identification (ID) information to implement a re-origination scheme (e.g., to improve an answer rate based on making incoming calls appear to be local calls), bypass network controls on an originating network, engage in arbitrage based on service type (e.g., local or long distance, wireless or wired, changing jurisdiction, or the like), provide fraudulent charge numbers (e.g., for billing a forwarded portion of a call to an original destination device and/or to an unallocated number), or the like. Implementations described herein may enable analyzing call forwarding activity. Analyzing call forwarding activity may enable detection of call forwarding activity that is associated with various improper purposes, which may allow a network operator to respond to improper call forwarding activity (e.g., by blocking call forwarding, terminating service, adjusting tariffs, or the like). Implementations described herein may additionally enable analyzing call forwarding activity that includes multiple chained, sequential, parallel, and/or forking (e.g., session initiation protocol (SIP) forking, including parallel forking and sequential forking) call forwarding activity.

Figure 1A:
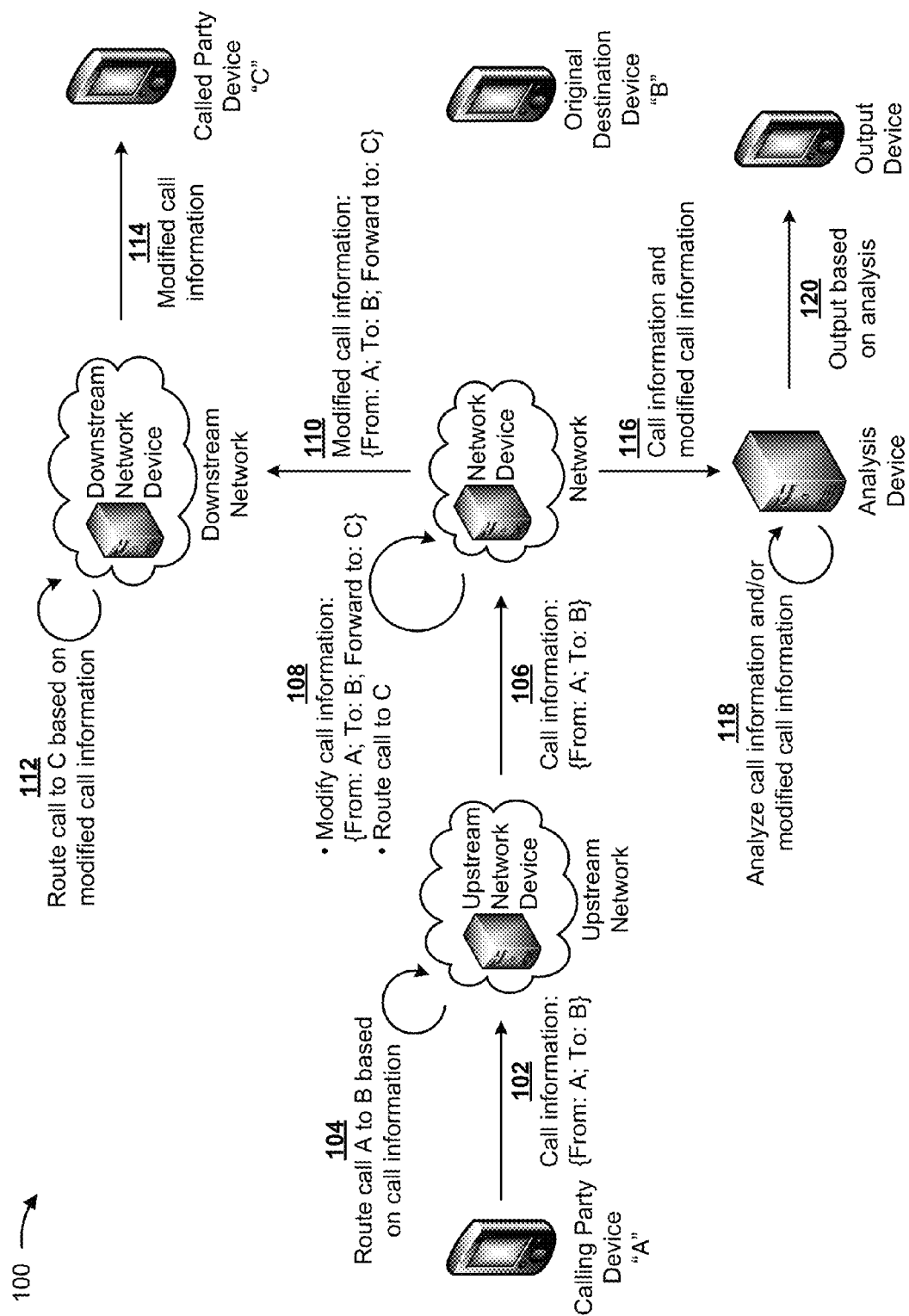
FIGS. 1A and 1B are diagrams of an overview of an example implementation described herein.
Figure 1B:
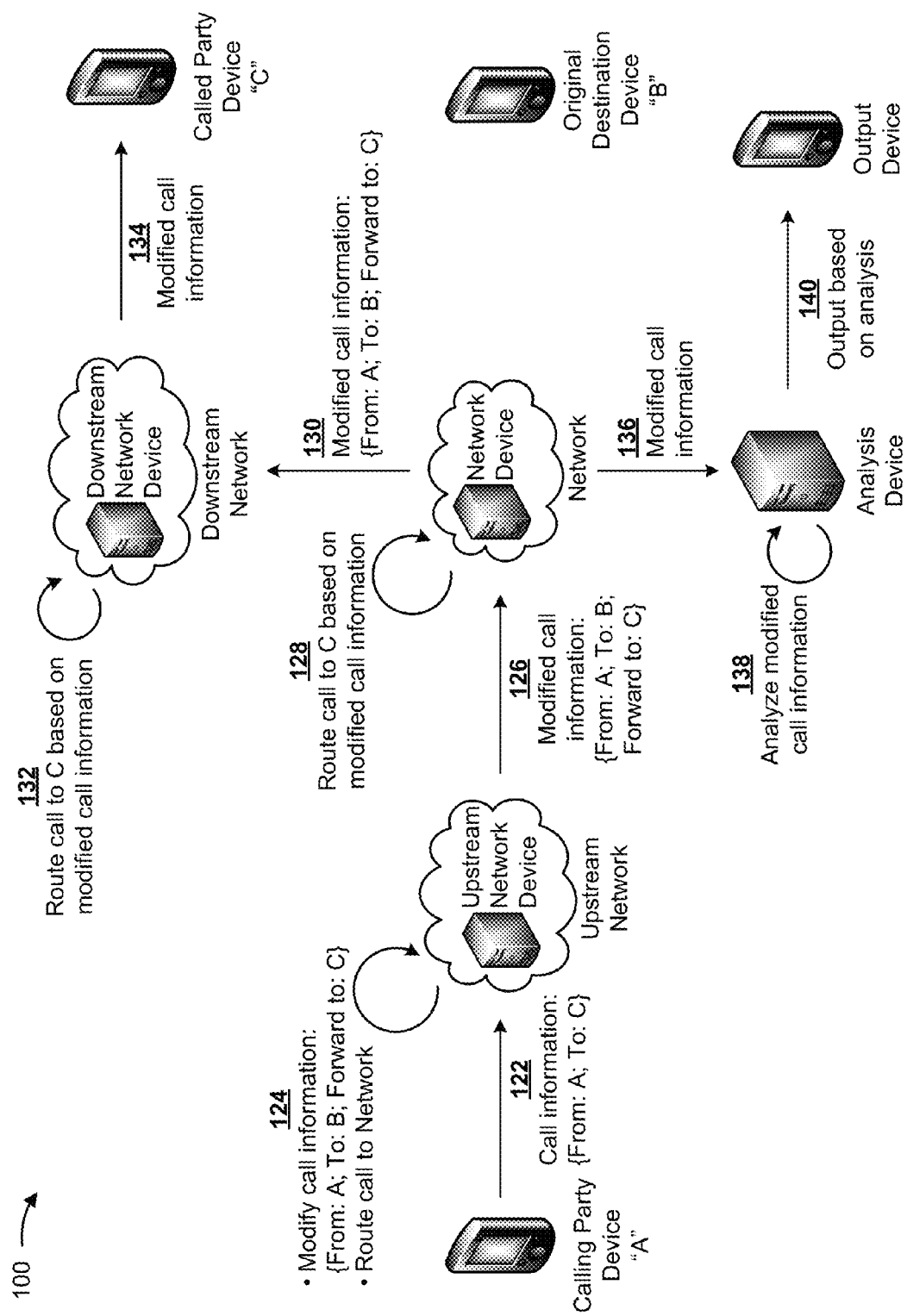

FIGS. 1A and 1B are diagrams of an overview of an example implementation 100 described herein. As shown in FIG. 1A, assume that a user has used a calling party device "A" to make a call (e.g., a voice call, a video call, a data call, or another type of communication session) to an original destination device "B." Further assume that original destination device "B" has set up call forwarding to forward calls to a called party device "C." As will be more fully discussed below, the call will be routed via an upstream network (e.g., by an upstream network device), a network (e.g., by a network device), and a downstream network (e.g., by a downstream network device). For the purposes of this overview, assume that the various devices and/or networks are exchanging messages that include call information associated with setting up, routing, and/or forwarding the call (e.g., SIP messages, Signaling System 7 (SS7) messages, or the like). Thus, references to sending call information and/or modified call information should be understood as sending a message that includes the call information and/or the modified call information. Further assume that the upstream network, the network, and the downstream network have sufficient information to route and/or forward the call as will be discussed below.

As further shown in FIG. 1A, and by reference number 102, the calling party device "A" may initiate the call by sending call information to the upstream network (e.g., to the upstream network device). The call information (e.g., {From: A; To: B}) may indicate that the call is to be routed from the calling party device "A" to the original destination device "B." As shown by reference number 104, and based on having received the call information from the calling party device "A," the upstream network device may continue routing the call, from the calling party device "A" to the original destination device "B," by sending the call information to the network (e.g., to the network device, as shown by reference number 106).

As shown by reference number 108, the network device may modify the call information (e.g., based on the original destination device "B" having set up call forwarding to the called party device "C") to generate modified call information (e.g., {From: A; To: B; Forward to: C}). In some implementations, the modified call information may provide multiple chained, sequential, parallel, and/or forking call forwarding activity (e.g., {From: A; To: B; Forward to: C, where C can be one or more of C-1 through C-N(N≥1)}). As further shown by reference number 108, the network device may then route the call to the called party device "C" by sending the modified call information to the downstream network (e.g., to the downstream network device, as shown by reference number 110). As shown by reference number 112, and based on having received the modified call information from the network device, the downstream network device may route the call to the called party device "C" by sending the modified call information to the called party device "C" (as shown by reference number 114).

As further shown in FIG. 1A, and by reference number 116, the network device may send the call information and the modified call information to the analysis device based on the network device having received the call information from the upstream network device and having generated the modified call information. As shown by reference number 118, the analysis device may analyze the call information and/or the modified call information. Based on the analysis, the analysis device may determine that the call was forwarded (e.g., to the called party device "C") and whether the forwarding exhibited a forwarding characteristic (e.g., service types involved, a forwarding rate, or the like) that satisfies a criterion (e.g., a combination of local and long distance call legs, a forwarding rate that exceeds a threshold, a deviation from a forwarding baseline, or the like). As shown by reference number 120, the analysis device may send an output message to an output device based on the results of the analysis.

As shown in FIG. 1B, assume that a user has used the calling party device "A" to make a call (e.g., a voice call, a video call, a data call, or another type of communication session) to the called party device "C." Further assume that, rather than routing a call directly from the calling party device "A" to the called party device "C," the upstream network device is to modify call information for the call such that the call appears to have been made to the original destination device "B" and then forwarded to the called party device "C." For example, the upstream network device may be taking advantage of a local call from the calling party device "A" to the original destination device "B" to avoid carrying a long distance call from the calling party device "A" to the called party device "C" (e.g., because the original destination device "B" will be charged for forwarding the call from the original destination device "B" to the called party device "C").

As shown in FIG. 1B, and by reference number 122, the calling party device "A" may initiate the call by sending call information to the upstream network (e.g., to the upstream network device). The call information (e.g., {From: A; To: C}) may indicate that the call is to be routed from the calling party device "A" to the called party device "C." As shown by reference number 124, and based on having received the call information from the calling party device "A," the upstream network device may modify the call information to create modified call information (e.g., {From: A; To: B; Forward to: C}) that makes the call appear as if the call had been routed via the original destination device "B." In some implementations, the modified call information may appear to provide multiple chained, sequential, parallel, and/or forking call forwarding activity (e.g., {From: A; To: B; Forward to: C, where C can be one or more of C-1 through C-N(N≥1)}). As further shown by reference number 124, the upstream network device may then route the call by sending the modified call information to the network (e.g., to the network device, as shown by reference number 126).

As shown by reference number 128, and based on having received the modified call information from the upstream network device, the network device may then route the call to the called party device "C" by sending the modified call information to the downstream network (e.g., to the downstream network device, as shown by reference number 130). As shown by reference number 132, and based on having received the modified call information from the network device, the downstream network device may route the call to the called party device "C" by sending the modified call information to the called party device "C" (as shown by reference number 134).

As further shown in FIG. 1B, and by reference number 136, the network device may send the modified call information to the analysis device based on the network device having received the modified call information from the upstream network device. As shown by reference number 138, the analysis device may analyze the modified call information to determine whether the call was forwarded. Based on the analysis, the analysis device may determine that the call was forwarded and/or that the call appears to have been forwarded (e.g., by the original destination device "B" and to the called party device "C") and that the forwarding exhibited a forwarding characteristic (e.g., local and long distance call legs, deviation from a forwarding baseline associated with the calling party device "A," the original destination device "B," the called party device "C," the upstream network, the network, and/or the downstream network, or the like) that satisfies a criterion (e.g., a combination of local and long distance call legs, a forwarding rate that deviates from a baseline forwarding rate, an involved service type that deviates from a baseline involved service type, a forwarding schedule that deviates from a baseline forwarding schedule, or the like). As shown by reference number 140, the analysis device may send an output message to the output device based on the results of the analysis. In some implementations, the analysis device and/or the output device may send an instruction (e.g., to the network device) to cause the network device to automatically take action (e.g., terminate service, adjust tariffs, or the like) based on a determination that a forwarding characteristic satisfies a criterion.

In this way, implementations described herein may enable analyzing call forwarding activity. Analyzing call forwarding activity may enable detection of improper call forwarding activity. Enabling detection of improper call forwarding activity may enable a network operator to block and/or limit such activity. Blocking and/or limiting improper call forwarding activity may enable a network operator to reduce consumption of network resources (e.g., by not carrying calls that a third party has attempted to route and/or forward through the operator's network). Analyzing call forwarding activity may further enable traffic pattern identification (e.g., at ingress to a network, within the network, and/or at egress from the network), which may support traffic pooling or the like.

As indicated above, FIGS. 1A and 1B are provided merely as an example. Other examples are possible and may differ from what was described with regard to FIGS. 1A and 1B.

Figure 2:
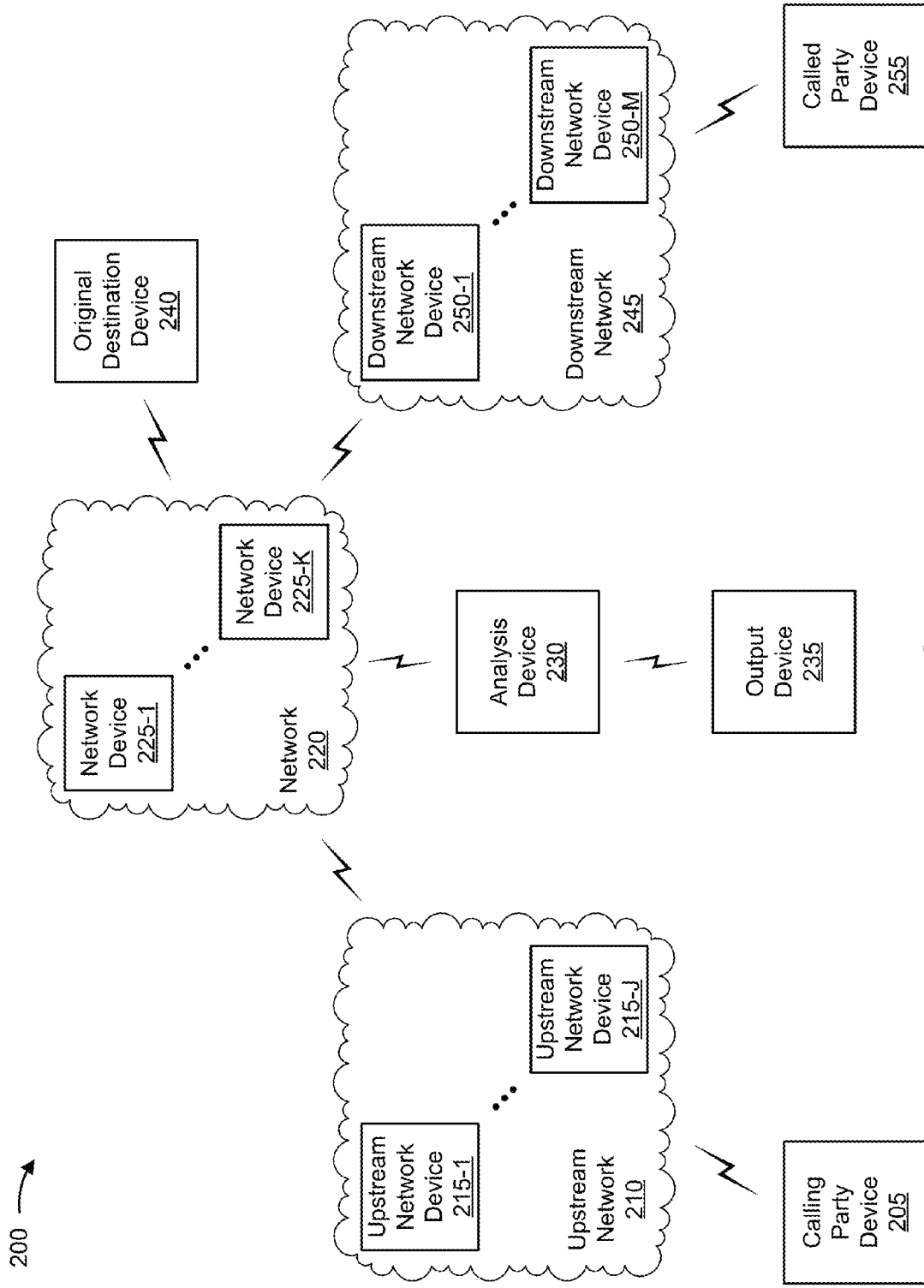
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a calling party device 205, an upstream network 210, one or more upstream network devices 215-1 through 215-J (J≥1) (hereinafter referred to collectively as "upstream network devices 215," and individually as "upstream network device 215"), a network 220, one or more network devices 225-1 through 225-K (K≥1) (hereinafter referred to collectively as "network devices 225," and individually as "network device 225"), an analysis device 230, an output device 235, an original destination device 240, a downstream network 245, one or more downstream network devices 250-1 through 250-M (M≥1) (hereinafter referred to collectively as "downstream network devices 250," and individually as "downstream network device 250"), and/or a called party device 255. Devices of environment 200 may interconnect via wired connections, wireless connections, or a combination of wired and wireless connections.

Calling party device 205 includes a device that is capable of communicating with one or more other devices included in environment 200. For example, calling party device 205 may include a wired communication device, a plain old telephone service (POTS) telephone, a voice over Internet protocol (VoIP) telephone, a wireless communication device, a radiotelephone, a personal communications system (PCS) terminal (e.g., that may combine a cellular radiotelephone with data processing and data communications capabilities), a smart phone, a desktop computer, a laptop computer, a tablet computer, a personal gaming system, and/or a similar device. In some implementations, calling party device 205 may be capable of receiving and/or providing information associated with an Internet protocol (IP) Multimedia Subsystem (IMS) service. In some implementations, calling party device 205 may include a device capable of initiating, receiving, and/or participating in a call (e.g., a voice call, a video call, a data call, or another type of communication session) with and/or from original destination device 240 and/or called party device 255. In some implementations, calling party device 205 may be associated with upstream network 210 (e.g., upstream network 210 may be a home network for calling party device 205).

Upstream network 210 includes one or more wired and/or wireless networks. For example, upstream network 210 may include a VoIP network, an IMS network, a session initiation protocol (SIP) network, a Signaling System 7 (SS7) network, a cellular network (e.g., a long-term evolution (LTE) network, a third generation (3G) network, a code division multiple access (CDMA) network, or the like), a public land mobile network (PLMN), a local area network (LAN), a wireless LAN (e.g., a Wi-Fi network), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, upstream network 210 may include one or more upstream network devices 215. In some implementations, upstream network 210 may use any protocol (e.g., SIP, SS7, SS7 utilizing an Advanced Intelligent Network (AIN), or the like) that allows upstream network device 215 to add and/or modify call information (e.g., a call set up message or another message associated with setting up and/or routing a call (e.g., a voice call, a video call, a data call, or another type of communication session)) to indicate that an originally dialed number has been forwarded to another number.

Upstream network device 215 includes one or more devices capable of originating, sending, receiving, processing, controlling, and/or transferring traffic and/or a message (e.g., a SIP message, an SS7 message, or the like) associated with a call (e.g., a voice call, a video call, a data call, or another type of communication session between calling party device 205, original destination device 240, and/or called party device 255). For example, upstream network device 215 may include a server, a gateway, a router, a modem, a switch, a firewall, a network interface card (NIC), a hub, a bridge, a signaling end point, a reverse proxy, a server (e.g., a proxy server), a security device, an intrusion detection device, a load balancer, an optical add/drop multiplexer (OADM), an end office switch, a softswitch, an IMS core device, a base station, or the like. In some implementations, upstream network device 215 may be an ingress device for upstream network 210 (e.g., at an originating edge of upstream network 210), an egress device for upstream network 210 (e.g., at a terminating edge of upstream network 210), and/or an intermediate device within upstream network 210 (e.g., between the originating and terminating edges of upstream network 210).

In some implementations (e.g., where upstream network 210 includes an IMS network), upstream network device 215 may include an application server, a home subscriber server (HSS), an interrogating call session control function device (I-CSCF), a serving call session control function device (S-CSCF), and/or a proxy call session control function device (P-CSCF). In some implementations (e.g., where upstream network 210 includes a SIP network), upstream network device 215 may include a proxy server, a SIP registrar, a redirect server, a session border controller, and/or a SIP gateway. In some implementations (e.g., where upstream network 210 includes an SS7 network), upstream network device 215 may include a service switching point (SSP), a signaling transfer point (STP), and/or a service control point (SCP).

Network 220 includes one or more wired and/or wireless networks. For example, network 220 may include a VoIP network, an IMS network, a SIP network, an SS7 network, a cellular network (e.g., an LTE network, a 3G network, a CDMA network, or the like), a PLMN, a LAN, a wireless LAN (e.g., a Wi-Fi network), a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, network 220 may include one or more network devices 225. In some implementations, network 220 may use any protocol (e.g., SIP, SS7, SS7 utilizing an AIN, or the like) that allows network device 225 to add and/or modify call information (e.g., a call set up message or another message associated with setting up and/or routing a call (e.g., a voice call, a video call, a data call, or another type of communication session)) to indicate that an originally dialed number has been forwarded to another number. In some implementations, network 220 and upstream network 210 may be operated by the same entity. In some implementations, network 220 and upstream network 210 may be operated by different entities. For example, upstream network 210 may be operated by an entity that purchases services (e.g., usage of network 220) from an entity that operates network 220.

Network device 225 includes one or more devices capable of originating, sending, receiving, processing, controlling, and/or transferring traffic and/or a message (e.g., a SIP message, an SS7 message, or the like) associated with a call (e.g., a voice call, a video call, a data call, or another type of communication session between calling party device 205, original destination device 240, and/or called party device 255). For example, network device 225 may include a server, a gateway, a router, a modem, a switch, a firewall, a NIC, a hub, a bridge, a signaling end point, a reverse proxy, a server (e.g., a proxy server), a security device, an intrusion detection device, a load balancer, an OADM, an end office switch, a softswitch, a base station, an IMS core device, or the like. In some implementations, network device 225 may be an ingress device for network 220 (e.g., at an originating edge of network 220), an egress device for network 220 (e.g., at a terminating edge of network 220), and/or an intermediate device within network 220 (e.g., between the originating and terminating edges of network 220).

In some implementations (e.g., where network 220 includes an IMS network), network device 225 may include an application server, an HSS, an I-CSCF, an S-CSCF, and/or a P-CSCF. In some implementations (e.g., where network 220 includes a SIP network), network device 225 may include a proxy server, a SIP registrar, a redirect server, a session border controller, and/or a SIP gateway. In some implementations (e.g., where network 220 includes an SS7 network), network device 225 may include an SSP, an STP, and/or an SCP.

Analysis device 230 includes one or more devices capable of analyzing traffic and/or a message (e.g., a SIP message, an SS7 message, or the like) associated with a call (e.g., a voice call, a video call, a data call, or another type of communication session between calling party device 205, original destination device 240, and/or called party device 255). For example, analysis device 230 may include a computing device (e.g., a desktop computer, a laptop computer, a tablet computer, a handheld computer, a server computer, a smart phone, a gaming device, a computer cluster, a cloud computer, or the like). In some implementations, analysis device 230 may determine whether a call has been forwarded and/or diverted and/or appears to have been forwarded and/or diverted. Although shown as being located external to network 220, analysis device 230 may be implemented within one or more network devices 225. In some implementations, analysis device 230 may receive call information from one or more network devices 225 (e.g., from a network device 225 acting as an ingress device, from a network device 225 acting as an intermediate device, and/or from a network device 225 acting as an egress device). In some implementations, analysis device 230 may receive call information from a supplier (e.g., a third party operator of SS7 probes) of data for ingress to, and/or egress from, network 220.

Output device 235 includes any device capable of processing and/or presenting (e.g., to a user) information output by analysis device 230 to enable actions to be taken based on the information received from analysis device 230. For example, output device 235 may include a PCS terminal, a smart phone, a desktop computer, a laptop computer, a tablet computer, a personal gaming system, a printer, and/or a similar device. In some implementations, analysis device 230 and/or output device 235 may automatically take action based on information output by analysis device 230.

Original destination device 240 includes a device that is capable of communicating with one or more other devices included in environment 200. For example, original destination device 240 may include a wired communication device, a POTS telephone, a VoIP telephone, a wireless communication device, a radiotelephone, a PCS terminal, a smart phone, a desktop computer, a laptop computer, a tablet computer, a personal gaming system, and/or a similar device. In some implementations, original destination device 240 may be capable of receiving and/or providing information associated with an IMS service. In some implementations, original destination device 240 may include a device capable of initiating, receiving, and/or participating in a call (e.g., a voice call, a video call, a data call, or another type of communication session) with and/or from calling party device 205 and/or called party device 255. In some implementations, original destination device 240 may be associated with network 220 (e.g., network 220 may be a home network for original destination device 240).

Downstream network 245 includes one or more wired and/or wireless networks. For example, downstream network 245 may include a VoIP network, an IMS network, a SIP network, an SS7 network, a cellular network (e.g., an LTE network, a 3G network, a CDMA network, or the like), a PLMN, a LAN, a wireless LAN (e.g., a Wi-Fi network), a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, downstream network 245 may include one or more downstream network devices 250. In some implementations, downstream network 245 may use any protocol (e.g., SIP, SS7, SS7 utilizing an AIN, or the like) that allows downstream network device 250 to add and/or modify call information (e.g., a call set up message or another message associated with setting up and/or routing a call (e.g., a voice call, a video call, a data call, or another type of communication session)) to indicate that an originally dialed number has been forwarded to another number. In some implementations, downstream network 245 and network 220 may be operated by the same entity. In some implementations, downstream network 245 and network 220 may be operated by different entities.

Downstream network device 250 includes one or more devices capable of originating, sending, receiving, processing, controlling, and/or transferring traffic and/or a message (e.g., a SIP message, an SS7 message, or the like) associated with a call (e.g., a voice call, a video call, a data call, or another type of communication session between calling party device 205, original destination device 240, and/or called party device 255). For example, downstream network device 250 may include a server, a gateway, a router, a modem, a switch, a firewall, a NIC, a hub, a bridge, a signaling end point, a reverse proxy, a server (e.g., a proxy server), a security device, an intrusion detection device, a load balancer, an OADM, an end office switch, a softswitch, a base station, an IMS core device, or the like. In some implementations, downstream network device 250 may be an ingress device for downstream network 245 (e.g., at an originating edge of downstream network 245), an egress device for downstream network 245 (e.g., at a terminating edge of downstream network 245), and/or an intermediate device within downstream network 245 (e.g., between the originating and terminating edges of downstream network 245).

In some implementations (e.g., where downstream network 245 includes an IMS network), downstream network device 250 may include an application server, an HSS, an I-CSCF, an S-CSCF, and/or a P-CSCF. In some implementations (e.g., where downstream network 245 includes a SIP network), downstream network device 250 may include a proxy server, a SIP registrar, a redirect server, a session border controller, and/or a SIP gateway. In some implementations (e.g., where downstream network 245 includes an SS7 network), downstream network device 250 may include an SSP, an STP, and/or an SCP.

Called party device 255 includes a device that is capable of communicating with one or more other devices included in environment 200. For example, called party device 255 may include a wired communication device, a POTS telephone, a VoIP telephone, a wireless communication device, a radiotelephone, a PCS terminal, a smart phone, a desktop computer, a laptop computer, a tablet computer, a personal gaming system, and/or a similar device. In some implementations, called party device 255 may be capable of receiving and/or providing information associated with an IMS service. In some implementations, called party device 255 may include a device capable of initiating, receiving, and/or participating in a call (e.g., a voice call, a video call, a data call, or another type of communication session) with and/or from calling party device 205 and/or original destination device 240. In some implementations, called party device 255 may be associated with downstream network 245 (e.g., downstream network 245 may be a home network for called party device 255).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
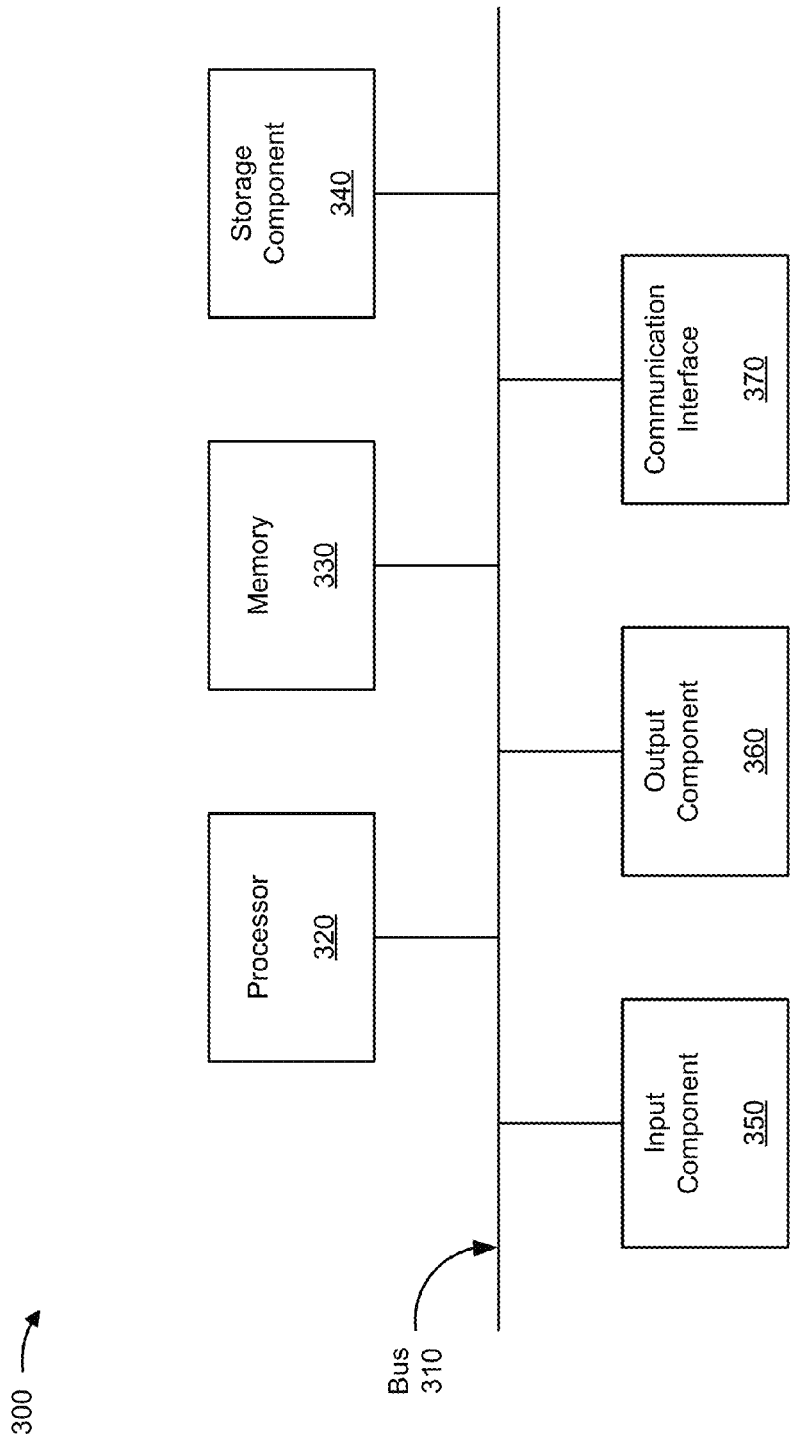
FIG. 3 is a diagram of example components of one or more devices of FIG. 2.

FIG. 3 is a diagram of example components of a device 300. Device 300 may correspond to calling party device 205, upstream network device 215, network device 225, analysis device 230, output device 235, original destination device 240, downstream network device 250, and/or called party device 255. In some implementations, calling party device 205, upstream network device 215, network device 225, analysis device 230, output device 235, original destination device 240, downstream network device 250, and/or called party device 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for analyzing call forwarding activity. In some implementations, one or more process blocks of FIG. 4 may be performed by analysis device 230. In some implementations, one or more process blocks of FIG. 4 may be performed by another device or a group of devices separate from or including analysis device 230, such as calling party device 205, upstream network device 215, network device 225, output device 235, original destination device 240, downstream network device 250, and/or called party device 255.

As shown in FIG. 4, process 400 may include receiving, from a network device, call information associated with a call that appears to be routed, from a calling party device, to an original destination device (block 410). For example, analysis device 230 may receive, from network device 225, call information associated with a call (e.g., a voice call, a video call, a data call, or another type of communication session) that is being routed and/or appears to be routed, from calling party device 205, to original destination device 240. In some implementations, a call that appears to be routed, from calling party device 205, to original destination device 240, may include a call that is being routed, from calling party device 205, to original destination device 240.

Call information may include information regarding routing and/or apparent routing of a call, along with various details associated with the call. For example, call information may include call origination information, call routing information, call forwarding information, call destination information, device information, network information, billing information, or the like. In some implementations, call information may include real time (e.g., during a call) and/or post-call data. In some implementations, call information may include a call detail record (CDR).

In some implementations, call information may include identification information associated with a device and/or a network involved with a call. For example, call information may include a device identifier associated with calling party device 205, original destination device 240, and/or called party device 255. In some implementations, a device identifier may be a telephone number, an address (e.g., a network address, such as an IP address, a Uniform Resource Identifier (URI), a Uniform Resource Locator (URL), or the like), a mobile device number (MDN), an international mobile subscriber identity (IMSI), a temporary mobile subscriber identity (TMSI), or the like. Call information may additionally, or alternatively, include an address for a device (e.g., upstream network device 215, network device 225, and/or downstream network device 250) associated with upstream network 210, network 220, and/or downstream network 245.

In some implementations, an address may include a network address (e.g., an IP address), a URI, a URL, or the like.

In some implementations, analysis device 230 may obtain call information from a message associated with the call (e.g., a SIP message, an SS7 message, or the like) that analysis device 230 receives from network device 225. For example, network device 225 may send, to analysis device 230, a call routing message and/or a call set up message (e.g., a message that network device 225 received from upstream network 210).

In some implementations (e.g., when network 220 is using SIP (e.g., when network 220 includes an IMS network)), the call routing message and/or the call set up message may include a SIP request message and/or a SIP response message. For example, the call routing message and/or the call set up message may include a SIP INVITE message (e.g., a SIP request to establish a media session between SIP user agents (e.g., logical network end-points used in a SIP session)). The SIP INVITE message may include a "To" field (e.g., with a device identifier associated with the intended recipient), a "From" field (e.g., with a device identifier associated with the sender), one or more "Via" fields (e.g., with a device identifier associated with a device where a response is expected and/or a device identifier associated with a server that may have routed the message), or the like. In some implementations, the SIP INVITE message may include a "Diversion" header, which carries information associated with forwarding a call. For example, a call may be forwarded (e.g., when using SIP) by adding a "Diversion" header to a SIP INVITE message and/or rewriting an existing "Diversion" header. The added or rewritten "Diversion" header may include a device identifier associated with calling party device 205, original destination device 240, and/or called party device 255. In some implementations, the SIP INVITE message may include information associated with forwarding a call other than in a "Diversion" header.

In some implementations (e.g., when network 220 is an SS7 network), the call routing message and/or the call set up message may include an SS7 initial address message (SS7 IAM). The SS7 IAM may be used to initiate signaling to establish a call within an SS7 network (e.g., signaling between two service switching points (SSPs)). In some implementations, the SS7 IAM may include various parameters (e.g., "Calling Party Number," "Original Called Number," "Redirection Information," "Redirecting Number," "Charge Number," or the like), which may include a device identifier associated with calling party device 205, original destination device 240, and/or called party device 255.

In some implementations, analysis device 230 may receive call information based on network device 225 routing, forwarding, and/or appearing to have forwarded a call. For example, network device 225 may send call information to analysis device 230 based on network device 225 routing a call (e.g., a call from calling party device 205 and/or a call to original destination device 240), forwarding a call (e.g., to called party device 255), and/or appearing to have forwarded a call (e.g., to called party device 255). In some implementations, network device 225 may route, forward, and/or appear to have forwarded a call based on the call information. In some implementations, network device 225 may route, forward, and/or appear to have forwarded a call that was routed to network device 225 from upstream network 210 (e.g., by upstream network device 215).

In some implementations, analysis device 230 may receive call information from an ingress device for network 220. For example, analysis device 230 may receive call information from an ingress device for network 220 when analysis device 230 receives call information from a network device 225 that is at an originating edge of network 220. In some implementations (e.g., where network 220 includes an IMS network), network device 225 may be an ingress device for network 220 when network device 225 is an I-CSCF that receives call information from another network (e.g., from upstream network 210). In some implementations (e.g., where network 220 is an SS7 network), network device 225 may be an ingress device for network 220 when network device 225 is a gateway STP.

In some implementations, analysis device 230 may receive call information from an egress device for network 220. For example, analysis device 230 may receive call information from an egress device for network 220 when analysis device 230 receives call information from a network device 225 that is at a terminating edge of network 220. In some implementations (e.g., where network 220 includes an IMS network), network device 225 may be an egress device for network 220 when network device 225 is an S-CSCF that sends call information to another network (e.g., to downstream network 245). In some implementations (e.g., where network 220 is an SS7 network), network device 225 may be an egress device for network 220 when network device 225 is a gateway STP.

In some implementations, analysis device 230 may receive call information from an intermediate device within network 220. For example, analysis device 230 may receive call information from an intermediate device within network 220 when analysis device 230 receives call information from a network device 225 that is between the originating and terminating edges of network 220. In some implementations, network device 225 may be an intermediate device within network 220 when network device 225 receives call information from an ingress device for network 220. Additionally, or alternatively, network device 225 may be an intermediate device within network 220 when network device 225 sends call information to an egress device for network 220.

In some implementations (e.g., where network 220 includes an IMS network), network device 225 may be an intermediate device within network 220 when network device 225 is an S-CSCF that receives call information from an I-CSCF in network 220, sends call information to an application server (AS) within network 220, and/or receives call information from an AS within network 220. Additionally, or alternatively, network device 225 may be an intermediate device within network 220 when network device 225 is an AS that receives call information from an S-CSCF within network 220 and/or sends call information to an S-CSCF within network 220. In some implementations (e.g., where network 220 is an SS7 network), network device 225 may be an intermediate device within network 220 when network device 225 is an SSP, STP, and/or SCP.

In some implementations, receiving call information from a network device may include receiving call information from a data source (e.g., an SS7 probe or the like) that obtained the call information before and/or after a call reached an originating edge of network 220 (e.g., before and/or after ingress to network 220). In some implementations, receiving call information from a network device may include receiving call information from a data source (e.g., an SS7 probe or the like) that obtained the call information before and/or after a call reached a terminating edge of network 220 (e.g., before and/or after egress from network 220). In some implementations, the data source (e.g., an SS7 probe or the like) may be operated by an operator of network 220. In some implementations, the data source (e.g., an SS7 probe or the like) may be operated by an entity other than the operator of network 220 (e.g., a third party vendor).

As further shown in FIG. 4, process 400 may include determining, based on the call information, that the call appears to have been forwarded to a called party device (block 420). For example, having received the call information from network device 225, analysis device 230 may determine whether the call appears to have been forwarded (e.g., from original destination device 240 and/or to called party device 255). In some implementations, determining that a call appears to have been forwarded (e.g., from original destination device 240 and/or to called party device 255) may include determining that the call is being forwarded (e.g., from original destination device 240 and/or to called party device 255). In some implementations, analysis device 230 may determine whether network device 225 forwarded the call and/or appears to have forwarded the call (e.g., from original destination device 240 and/or to called party device 255).

Analysis device 230 may determine that the call appears to have been forwarded based on the call information. For example, analysis device 230 may obtain, from the call information, a device identifier associated with calling party device 205, original destination device 240, and/or called party device 255. In some implementations, analysis device 230 may determine that the call appears to have been forwarded based on the call information including a device identifier for called party device 255 (e.g., the device to which the call appears to have been forwarded) in addition to a device identifier for original destination device 240 (e.g., the device that appears to have originally been called by calling party device 205). In some implementations, analysis device 230 may determine that the call appears to have been forwarded based on a message (e.g., a SIP message, an SS7 message, or the like) included in the call information that analysis device 230 receives from network device 225.

In some implementations (e.g., when network 220 is using SIP (e.g., when network 220 includes an IMS network)), analysis device 230 may determine that a call appears to have been forwarded based on a SIP message associated with the call. For example, analysis device 230 may determine that a call appears to have been forwarded when a SIP message (e.g., a SIP INVITE message) includes a diversion header. In some implementations, analysis device 230 may determine that a call appears to have been forwarded when a SIP message includes call forwarding information other than in a diversion header.

In some implementations (e.g., when network 220 is an SS7 network), analysis device 230 may determine that the call appears to have been forwarded based on an SS7 message associated with the call. For example, analysis device 230 may determine that a call appears to have been forwarded when an SS7 message includes the "Original Called Number" parameter. In some implementations, analysis device 230 may determine that a call appears to have been forwarded when an SS7 message includes call forwarding information other than in the "Original Called Number" parameter.

As further shown in FIG. 4, process 400 may include determining, based on the call information, a forwarding characteristic for the call (block 430). For example, having determined that a call appears to have been forwarded, analysis device 230 may determine a forwarding characteristic for the call based on the call information. The forwarding characteristic may indicate involved service types, a forwarding rate, a forwarding baseline, deviation from a forwarding baseline, multiple forwards associated with a single call, or the like.

In some implementations, analysis device 230 may determine a forwarding characteristic associated with a specific device and/or network. For example, analysis device 230 may determine a forwarding characteristic based on a device identifier associated with calling party device 205, original destination device 240, and/or called party device 255. In some implementations, determining a forwarding characteristic for the call may include determining (e.g., based on a lookup in an HSS, an SS7 service data point (SDP) database, and/or another suitable database) that a device identifier associated with original destination device 240 is an unallocated number (e.g., that the device identifier is fictitious). Additionally, or alternatively, analysis device 230 may determine a forwarding characteristic based on a network identifier associated with upstream network 210, network 220, and/or downstream network 245.

In some implementations, analysis device 230 may determine, based on the call information, involved service types (e.g., local, long distance, wireless, wired, cross-jurisdiction, or the like) for various legs of the call. For example, analysis device 230 may determine that a call from calling party device 205 to original destination device 240 is a local call. Additionally, or alternatively, analysis device 230 may determine that a call from original destination device 240 to called party device 255 is a long distance call. Additionally, or alternatively, analysis device 230 may determine that a call from calling party device 205 to called party device 255 is a long distance call. Additionally, or alternatively, analysis device 230 may determine that a call from calling party device 205 to original destination device 240 is associated with a first jurisdiction, while a call from original destination device 240 to the called party device 255 is associated with a second jurisdiction.

In some implementations, analysis device 230 may determine, based on the call information, a forwarding rate associated with calling party device 205, original destination device 240, called party device 255, upstream network 210, network 220, and/or downstream network 245. In some implementations, a forwarding rate may be a ratio of forwarded calls to total calls associated with a particular device (e.g., calling party device 205, original destination device 240, and/or called party device 255) and/or with a particular network (e.g., upstream network 210, network 220, and/or downstream network 245).

In some implementations, analysis device 230 may determine, based on the call information, a forwarding baseline associated with calling party device 205, original destination device 240, called party device 255, upstream network 210, network 220, and/or downstream network 245. In some implementations, a forwarding baseline may include a baseline forwarding rate, a baseline of involved service types, a baseline forwarding schedule, or the like.

In some implementations, a forwarding baseline may be based on historical call forwarding activity associated with a particular device (e.g., calling party device 205, original destination device 240, and/or called party device 255) and/or with a particular network (e.g., upstream network 210, network 220, and/or downstream network 245). For example, analysis device 230 may compile a forwarding baseline based on call information received, over time, from network device 225.

In some implementations, a forwarding baseline may be based on call forwarding activity that has been agreed upon by one or more users associated with a particular device (e.g., calling party device 205, original destination device 240, and/or called party device 255) and/or one or more operators associated with a particular network (e.g., upstream network 210, network 220, and/or downstream network 245). For example, a user may agree with a network operator that specified call forwarding activity is permissible. In some implementations, such permissible call forwarding activity may be based on appropriate tariffs for the call forwarding activity.

As further shown in FIG. 4, process 400 may include determining that the forwarding characteristic satisfies a criterion (block 440). For example, having determined a forwarding characteristic for a call, analysis device 230 may determine whether the forwarding characteristic satisfies a criterion. In some implementations, analysis device 230 may determine whether a forwarding characteristic satisfies a criterion based on comparing the forwarding characteristic and the criterion.

In some implementations, analysis device 230 may determine that a forwarding characteristic satisfies a criterion associated with a particular device (e.g., calling party device 205, original destination device 240, and/or called party device 255) and/or with a particular network (e.g., upstream network 210, network 220, and/or downstream network 245). In some implementations, analysis device 230 may determine that a forwarding characteristic does not satisfy a criterion associated with a particular device (e.g., calling party device 205, original destination device 240, and/or called party device 255) and/or with a particular network (e.g., upstream network 210, network 220, and/or downstream network 245).

In some implementations, analysis device 230 may determine that a forwarding characteristic satisfies a criterion based on deviation from a forwarding baseline. For example, analysis device 230 may determine that a forwarding characteristic satisfies a criterion when a forwarding rate deviates from a baseline forwarding rate, an involved service type deviates from a baseline involved service type, a forwarding schedule deviates from a baseline forwarding schedule, or the like.

In some implementations, analysis device 230 may determine that a forwarding characteristic satisfies a criterion based on evaluating involved service types for a call. For example, analysis device 230 may determine that a forwarding characteristic satisfies a criterion when a call from calling party device 205 to original destination device 240 is a local call and either a call from original destination device 240 to called party device 255 or a call from calling party device 205 to called party device 255 is a long distance call. Additionally, or alternatively, analysis device 230 may determine that a forwarding characteristic satisfies a criterion when a call from calling party device 205 to original destination device 240 is associated with a first jurisdiction, while a call from original destination device 240 to called party device 255 is associated with a second jurisdiction that is different from the first jurisdiction. Evaluating involved service types may enable detection of call forwarding activity that selectively forwards calls through different networks to split a call into multiple segments, some of which may be local calls and some of which may be long distance calls, for purposes of arbitrage.

In some implementations, analysis device 230 may determine that a forwarding characteristic satisfies a criterion based on determining (e.g., based on a lookup in an HSS, an SS7 service data point (SDP) database, and/or another suitable database) that a device identifier associated with original destination device 240 is an unallocated number.

For example, calling party device 205 and/or upstream network 210 may inject a fictitious device identifier for original destination device 240 (e.g., add a fictitious diversion header to a SIP INVITE message). Based on the fictitious device identifier, a call to called party device 255 may appear to be going to original destination device 240 (e.g., a local call from calling party device 205). However, the call may then be forwarded to called party device 255, rather than having gone directly to called party device 255, which may be a long distance call for calling party device 205 and/or original destination device 240.

In some implementations, analysis device 230 may determine that a forwarding characteristic satisfies a criterion based on a threshold. For example, analysis device 230 may determine that a forwarding rate and/or a forwarding schedule exceeds a threshold. In some implementations, analysis device 230 may consider multiple different thresholds. For example, analysis device 230 may use different thresholds for different forwarding characteristics. In some implementations, a forwarding rate over 25%, 50%, or 75% may exceed a threshold. In some implementations, any call forwarding activity that involves different service types (e.g., local and long distance, multiple jurisdictions, or the like) and deviates from a forwarding base line may exceed the threshold. In some implementations, any use of a device identifier associated with original destination device 240 that is an unallocated number may exceed the threshold.

As further shown in FIG. 4, process 400 may include sending an output message based on the forwarding characteristic satisfying the criterion (block 450). For example, analysis device 230 may send an output message (e.g., to output device 235) based on determining that the forwarding characteristic satisfies the criterion.

In some implementations, the output message may provide information to support responding to call forwarding activity that has a particular forwarding characteristic and/or that has a forwarding characteristic that satisfies a criterion (e.g., deviation from a forwarding baseline, a forwarding type, a threshold, or the like). For example, the output message may identify forwarding activity associated with improper usage of call forwarding (e.g., call origination obfuscation, caller ID alteration, service type arbitrage, providing fraudulent or unallocated charge numbers, or the like). In some implementations, the output message may include information to support baseline trending, resource allocation, or the like.

In some implementations, analysis device 230 and/or output device 235 may send, to third parties, information based on the output message to enable the third parties to act on the information. For example, analysis device 230 and/or output device 235 may send the information to a user of calling party device 205, an operator of upstream network 210, an operator of network 220, a user of original destination device 240, an operator of downstream network 245, and/or a user of called party device 255.

In some implementations, analysis device 230 and/or output device 235 may cause network device 225 to automatically take action based on information output by analysis device 230. For example, based on a determination that a forwarding characteristic satisfies a criterion, analysis device 230 and/or output device 235 may send an instruction (e.g., to network device 225) to configure network device 225 to automatically block an attempt to forward a call, terminate service (e.g., for original destination device 240), terminate a relationship with an operator of upstream network 210 and/or an operator of downstream network 245, adjust and/or throttle service, adjust rates and/or tariffs, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, implementations described herein may enable analyzing call forwarding activity. Analyzing call forwarding activity may enable detection of improper call forwarding activity. Enabling detection of improper call forwarding activity may enable a network operator to block and/or limit such activity. Blocking and/or limiting improper call forwarding activity may enable a network operator to conserve network resources (e.g., by not carrying calls that a third party has attempted to route and/or forward through the operator's network). Analyzing call forwarding activity may further enable traffic pattern identification (e.g., at ingress, egress, and/or within a network), which may support traffic pooling or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a network device, call information associated with a call,
the call being from a calling party device,
the call appearing to be intended for a destination device, and
the call information being received, from the network device, based on the network device having routed the call;
determine, based on the call information, whether the call has been forwarded to a called party device that is different from the destination device;
determine, based on determining that the call has been forwarded to the called party device, a forwarding characteristic for the call,
the forwarding characteristic indicating at least one of:
a service type,
the service type indicating at least one of:
a local call,
a long distance call,
a wireless call,
a wired call, or
a cross jurisdiction call,
a forwarding rate,
a forwarding baseline, or
a deviation from the forwarding baseline;
determine that the forwarding characteristic satisfies a criterion; and
send an output message, based on the forwarding characteristic satisfying the criterion, to support responding to call forwarding activity having the forwarding characteristic.

2. The device of claim 1, where the one or more processors, when receiving the call information, are to:
receive, from the network device, the call information based on the network device appearing to have forwarded the call, to the called party device, based on the call information.

3. The device of claim 1,
where the call information includes at least one of:
a first device identifier associated with the calling party device,
a second device identifier associated with the destination device, or a third device identifier associated with the called party device; and where the one or more processors, when determining the forwarding characteristic for the call, are to:

determine the forwarding characteristic for the call based on at least one of the first device identifier, the second device identifier, or the third device identifier.

4. The device of claim 1, where the call was routed to the network device from an upstream network;

where the one or more processors are further to:

determine the forwarding baseline, the forwarding baseline being for at least one of:

the upstream network,
the calling party device,
the destination device, or
the called party device; and determine, based on the call information, the deviation from the forwarding baseline; and where the one or more processors, when determining that the forwarding characteristic satisfies the criterion, are to:

determine that the forwarding characteristic satisfies the criterion based on the deviation from the forwarding baseline.

5. The device of claim 1, where the one or more processors, when determining the forwarding characteristic for the call, are to:

determine, based on the call information, that a first call from the calling party device to the destination device is the local call, and determine, based on the call information, that a second call from the destination device to the called party device is the long distance call; and where the one or more processors, when determining that the forwarding characteristic satisfies the criterion, are to:

determine that the forwarding characteristic satisfies the criterion based on the first call being the local call and the second call being the long distance call.

6. The device of claim 1, where the network device comprises at least one of:

an ingress device,
an intermediate device, or
an egress device; and where the one or more processors, when receiving the call information associated with the call, are to:

receive the call information from the at least one of:

the ingress device,
the intermediate device, or
the egress device.

7. The device of claim 1, where the one or more processors, when determining whether the call has been forwarded to the called party device, are to:

determine whether the network device has forwarded the call to the called party device.

8. A non-transitory computer-readable medium storing instructions, the instructions comprising:

one or more instructions that, when executed by one or more processors, cause the one or more processors to:

receive, from a network device, call information associated with a call, the call being from a calling party device,
the call appearing to be intended for a destination device, and the call information being received, from the network device, based on the network device having routed the call;

determine, based on the call information, whether the call has been forwarded to a called party device that is different from the destination device;

determine, based on determining that the call has been forwarded to the called party device, a forwarding characteristic for the call, the forwarding characteristic indicating at least one of:

a service type, the service type indicating at least one of:

a local call,
a long distance call,
a wireless call,
a wired call, or
a cross jurisdiction call, a forwarding rate,
a forwarding baseline, or
a deviation from the forwarding baseline;

determine, based on comparing the forwarding characteristic and at least one criterion, that the forwarding characteristic satisfies the at least one criterion; and send an output message, based on the forwarding characteristic satisfying the at least one criterion, to support processing call forwarding activity having the forwarding characteristic.

9. The non-transitory computer-readable medium of claim 8, where the at least one criterion includes:

a first criterion associated with the calling party device,
a second criterion associated with the destination device, and
a third criterion associated with the called party device; and where the one or more instructions, that cause the one or more processors to determine that the forwarding characteristic satisfies the at least one criterion, cause the one or more processors to:

determine that the forwarding characteristic satisfies at least one of:

the first criterion,
the second criterion, or
the third criterion.

10. The non-transitory computer-readable medium of claim 8, where the network device comprises an ingress device to a network; and where the one or more instructions, that cause the one or more processors to receive the call information associated with the call, cause the one or more processors to:

receive the call information from the ingress device.

11. The non-transitory computer-readable medium of claim 8, where the one or more instructions, that cause the one or more processors to determine the forwarding characteristic for the call, cause the one or more processors to:

determine, based on the call information, that a first call from the calling party device to the destination device is the local call, and determine, based on the call information, that at least one of a second call from the calling party device to the called party device or a third call from the destination device to the called party device is the long distance call; and where the one or more instructions, that cause the one or more processors to determine that the forwarding characteristic satisfies the at least one criterion, cause the one or more processors to:
  determine that the forwarding characteristic satisfies the at least one criterion based on the first call being the local call and the at least one of the second call or the third call being the long distance call.

12. The non-transitory computer-readable medium of claim 8, where the call information includes at least one of:
  a first device identifier associated with the calling party device,
  a second device identifier associated with the destination device, or
  a third device identifier associated with the called party device; and
  where the one or more instructions, that cause the one or more processors to determine the forwarding characteristic for the call, cause the one or more processors to:
    determine the forwarding characteristic for the call based on at least one of:
      the first device identifier,
      the second device identifier, or
      the third device identifier.

13. The non-transitory computer-readable medium of claim 8, where the call was routed to the network device from an upstream network;
  where the one or more instructions, when executed by the one or more processors, further cause the one or more processors to:
    determine the forwarding baseline,
      the forwarding baseline being for at least one of:
        the upstream network,
        the calling party device,
        the destination device, or
        the called party device; and
    determine, based on the call information, the deviation from the forwarding baseline; and
  where the one or more instructions, that cause the one or more processors to determine that the forwarding characteristic satisfies the at least one criterion, cause the one or more processors to:
    determine that the forwarding characteristic satisfies the criterion based on the deviation from the forwarding baseline.

14. The non-transitory computer-readable medium of claim 8, where the forwarding characteristic comprises the forwarding rate;
  where the at least one criterion comprises a baseline forwarding rate;
  where the one or more instructions, that cause the one or more processors to determine that the forwarding characteristic satisfies the at least one criterion, cause the one or more processors to:
    determine that the forwarding characteristic satisfies the at least one criterion when the forwarding rate deviates from the baseline forwarding rate.

15. A method, comprising:
  receiving, by a device and from a network device, call information associated with a call,
    the call appearing to be routed from a calling party device and to a destination device, and
    the call information being received, from the network device, based on the network device having routed the call;
  determining, by the device and based on the call information, whether the network device has forwarded the call to a called party device that is different from the destination device;
  determining, by the device and based on determining that the device has forwarded the call to the called party device, a forwarding characteristic for the call,
    the forwarding characteristic indicating at least one of:
      a service type,
        the service type indicating at least one of:
          a local call,
          a long distance call,
          a wireless call,
          a wired call, or
          a cross jurisdiction call,
      a forwarding rate,
      a forwarding baseline, or
      a deviation from the forwarding baseline;
  comparing, by the device, the forwarding characteristic and at least one criterion;
  determining, by the device, that the forwarding characteristic satisfies the at least one criterion; and
  sending, by the device, an output message based on determining that the forwarding characteristic satisfies the at least one criterion to support responding to call forwarding activity that satisfies the at least one criterion.

16. The method of claim 15, further comprising:
  determining that a first call from the calling party device to the destination device is associated with a first jurisdiction, and
  determining that a second call from the destination device to the called party device is associated with a second jurisdiction; and
  where determining that the forwarding characteristic satisfies the at least one criterion comprises:
    determining that the forwarding characteristic satisfies the at least one criterion based on the second jurisdiction being different from the first jurisdiction.

17. The method of claim 15, where the at least one criterion includes:
  a first criterion associated with the calling party device,
  a second criterion associated with the destination device,
  a third criterion associated with the called party device, and
  a fourth criterion associated with an upstream network,
    the call having been routed to the network device from the upstream network; and
  where determining that the forwarding characteristic satisfies the at least one criterion comprises:
    determining that the forwarding characteristic satisfies at least one of:
      the first criterion,
      the second criterion,
      the third criterion, or
      the fourth criterion.

18. The method of claim 15, where determining whether the network device has forwarded the call to the called party device comprises:
  determining, based on the call information, whether the network device has forwarded the call, to the called party device, from the destination device.

19. The method of claim 15, where determining the forwarding characteristic for the call comprises:
  determining, based on the call information, that a first call from the calling party device to the called party device is the long distance call, and determining, based on the call information, that a second call from the calling party device to the destination device is the local call; and where determining that the forwarding characteristic satisfies the at least one criterion comprises:
determining that the forwarding characteristic satisfies the at least one criterion based on the first call being the long distance call and the second call being the local call.

20. The method of claim 15, where the forwarding characteristic comprises the forwarding rate; and
where determining that the forwarding characteristic satisfies the at least one criterion comprises:
determining that the forwarding rate exceeds a threshold.

* * * * *